United States Patent
Heggeland et al.

[11] Patent Number: 5,878,919
[45] Date of Patent: Mar. 9, 1999

[54] FLUID DISPENSING MECHANISM

[76] Inventors: Bruce E. Heggeland, 1480 Exeter Ct., Barrington, Ill. 60001; William R. Blechschmidt, III, 23570 High Rd., Lake Zurich, Ill. 60047

[21] Appl. No.: 915,477

[22] Filed: Aug. 20, 1997

[51] Int. Cl.[6] .................................................. B65D 35/56
[52] U.S. Cl. ................................ 222/214; 222/505; 251/7
[58] Field of Search ...................................... 222/212, 214, 222/505, 511, 506, 490, 494; 251/4, 7, 8, 9

[56]  References Cited

U.S. PATENT DOCUMENTS

| | | | |
|---|---|---|---|
| 1,357,551 | 11/1920 | Frey et al. ................................... | 251/7 |
| 2,569,502 | 2/1951 | Elliott ....................................... | 251/7 X |
| 2,681,751 | 6/1954 | Stone et al. ............................... | 222/212 |
| 2,958,502 | 11/1960 | Grigsby ...................................... | 251/8 |
| 3,116,854 | 1/1964 | Rabb et al. .......................... | 222/506 X |
| 3,278,153 | 10/1966 | Dallas ........................................ | 251/7 |
| 3,308,898 | 3/1967 | Allen et al. .......................... | 222/214 X |
| 4,286,733 | 9/1981 | Weikert ................................ | 222/505 X |
| 4,892,229 | 1/1990 | Rudick .................................. | 222/505 X |
| 5,082,150 | 1/1992 | Steiner et al. ....................... | 222/490 X |
| 5,697,526 | 12/1997 | Lee ........................................ | 222/214 X |

*Primary Examiner*—Kevin P. Shaver
*Attorney, Agent, or Firm*—Banner & Witcoff, Ltd.

[57] ABSTRACT

A product dispenser utilizes an elastomeric tube which is compressed between a plunger and a frame by means of axially slidable members which support the plunger and frame for movement in equal and opposite directions so as to compress the tube and thereby force an aliquot portion of liquid from the tube. Release of the tube will cause the tube to return to its original position due to the elasticity of the tube.

14 Claims, 16 Drawing Sheets

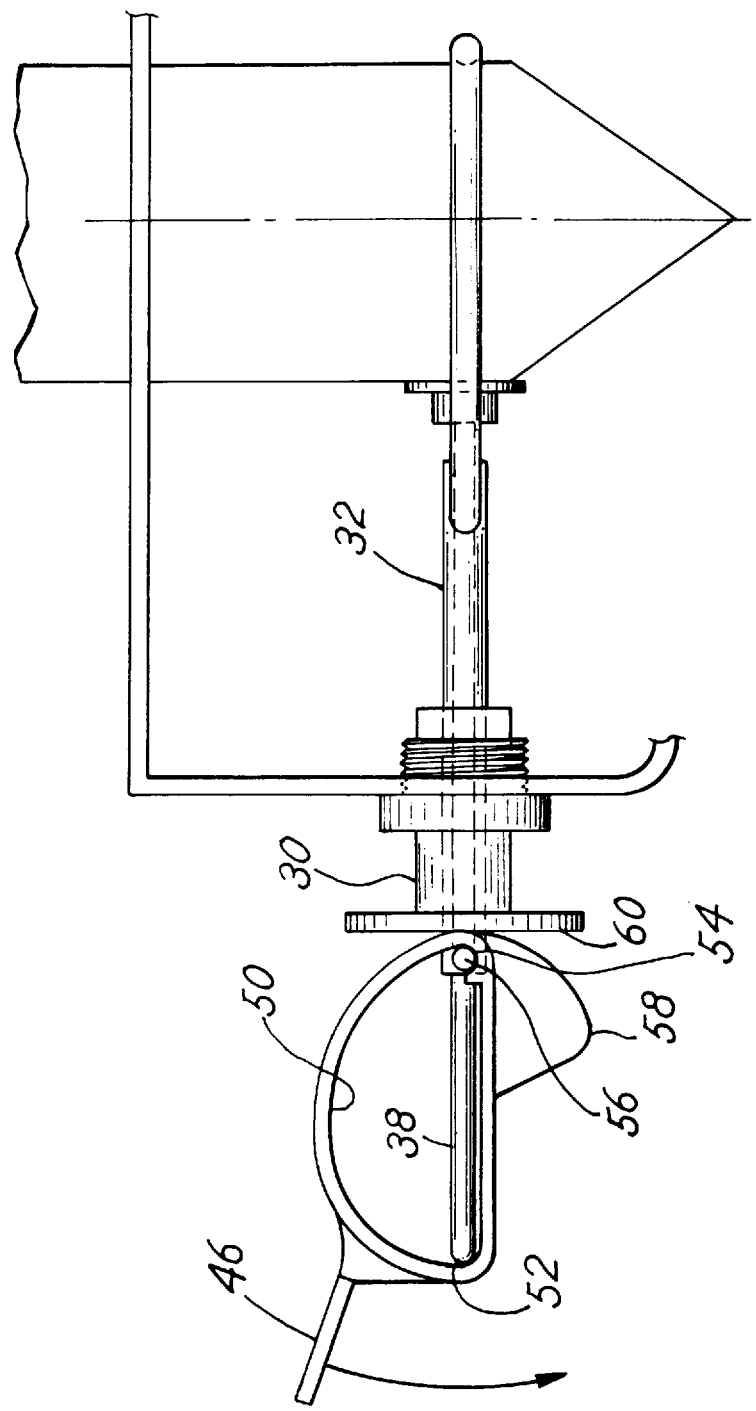

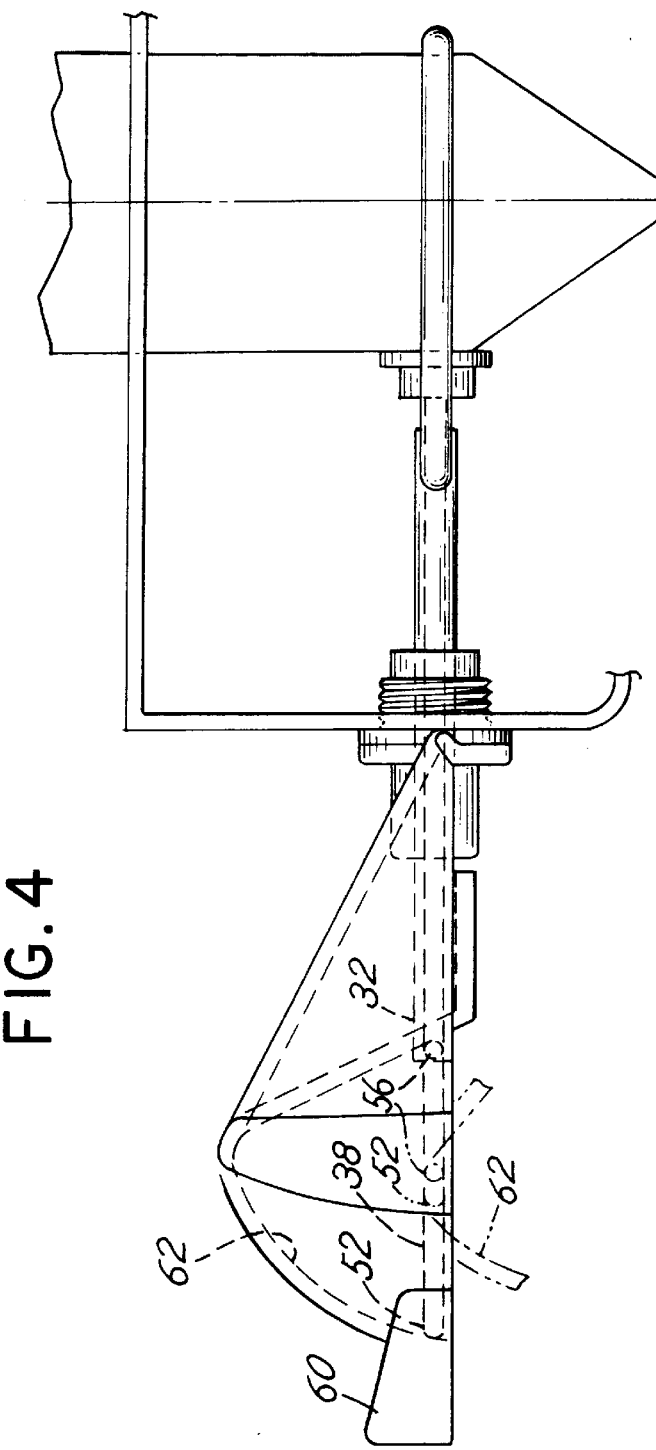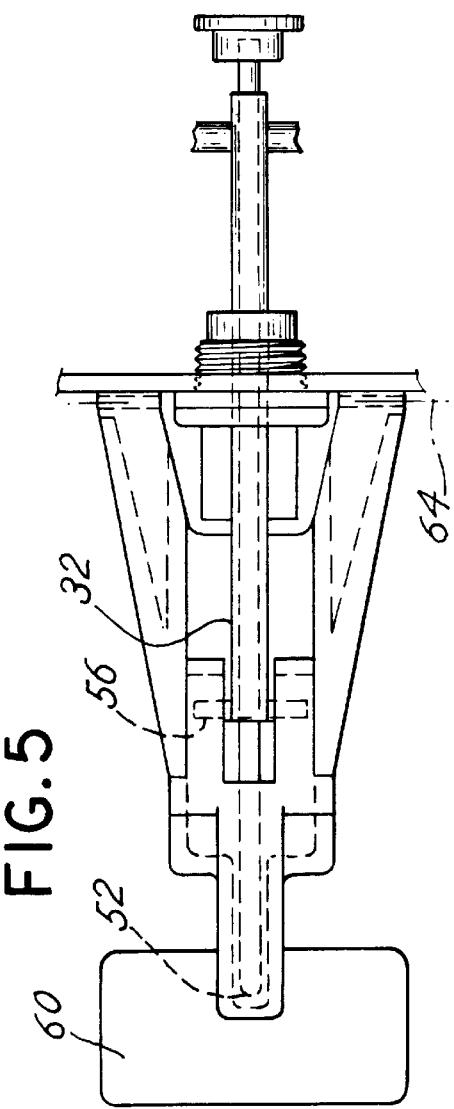

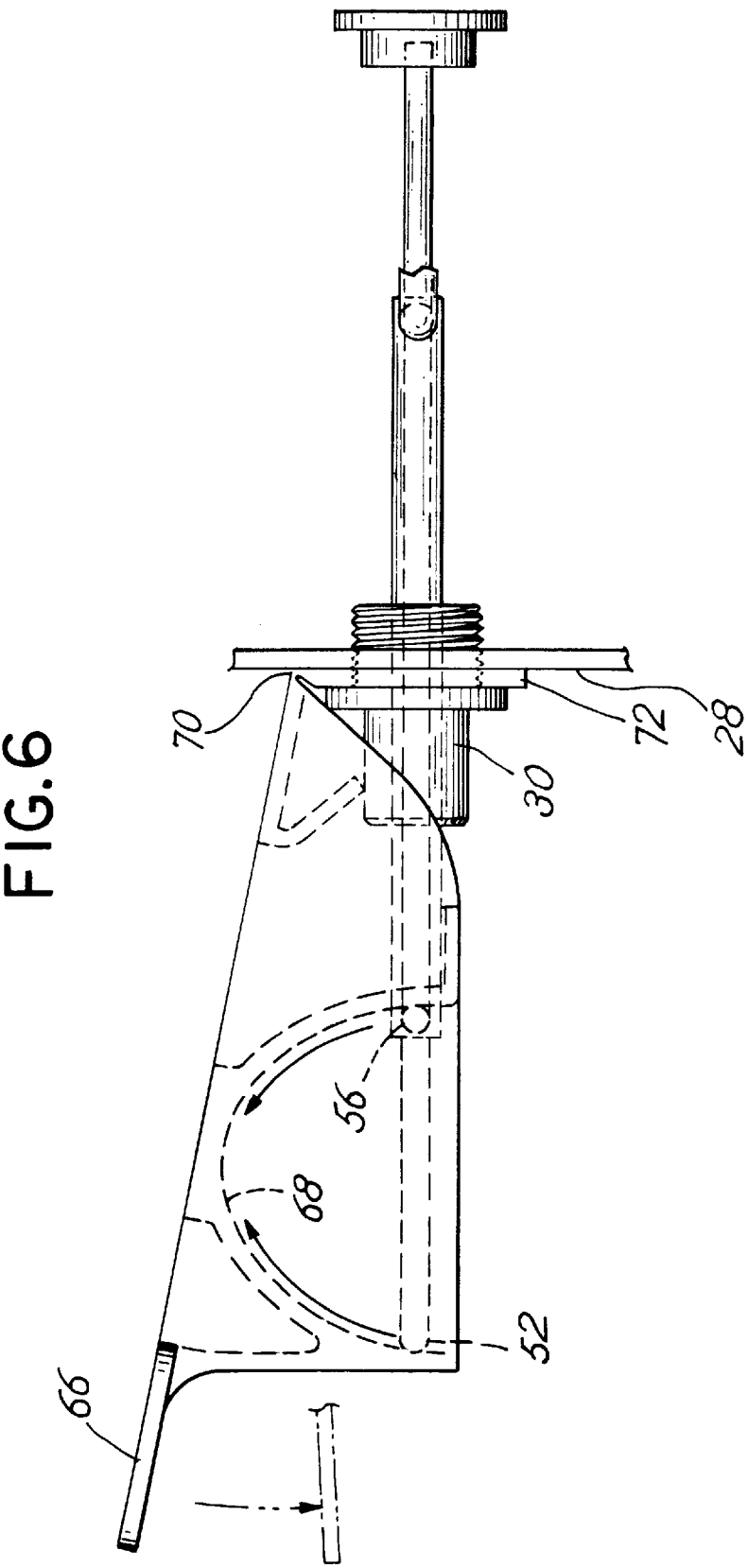

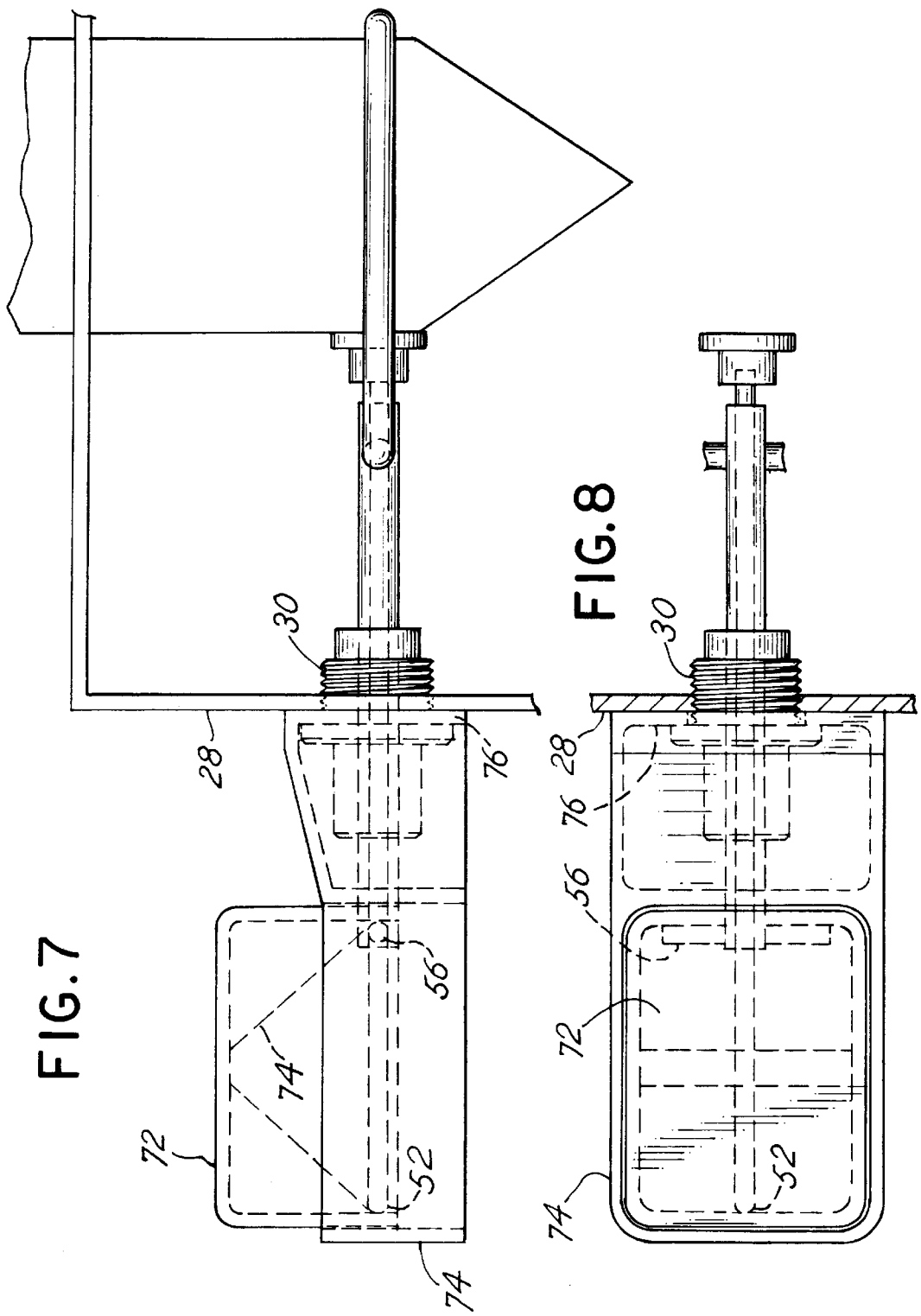

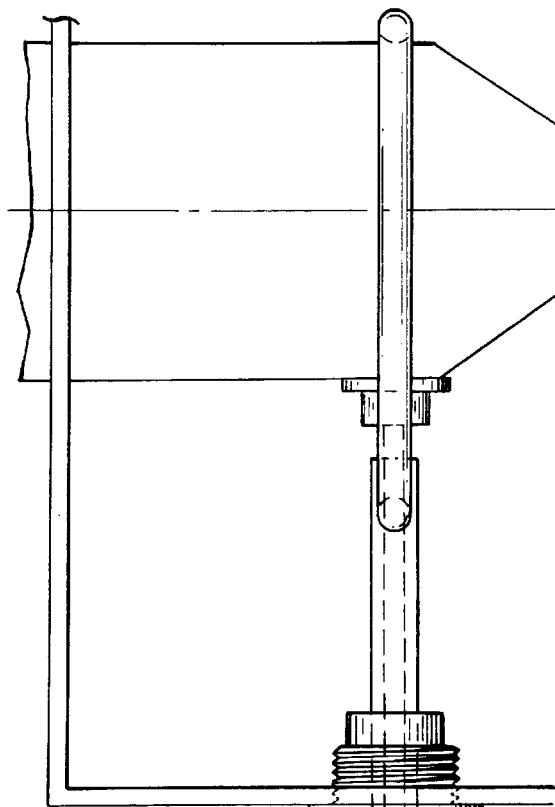
FIG.9
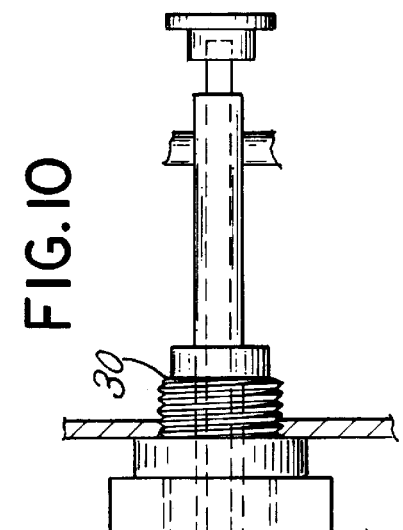
FIG.10
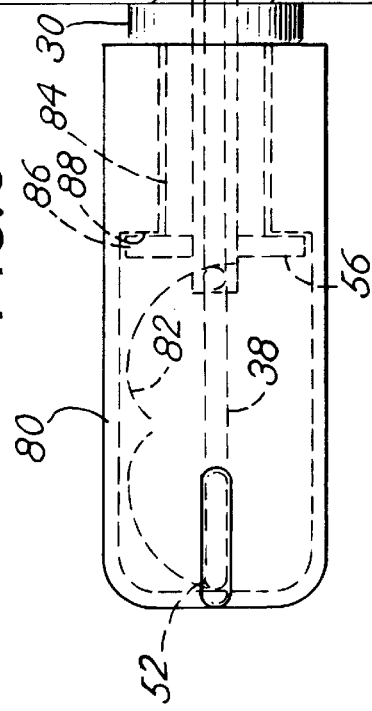
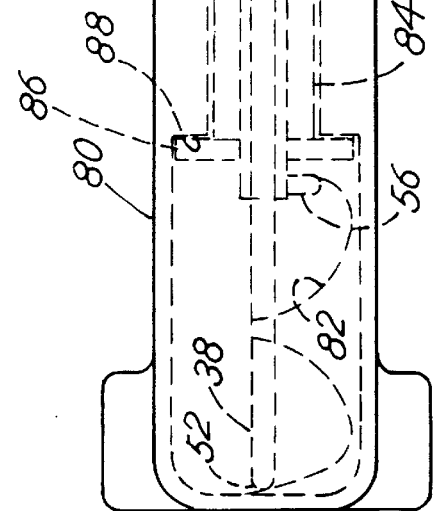
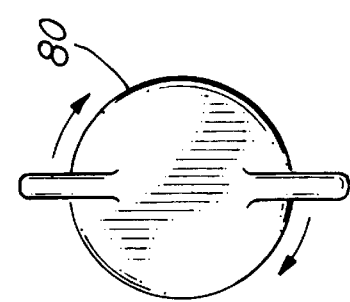
FIG.11

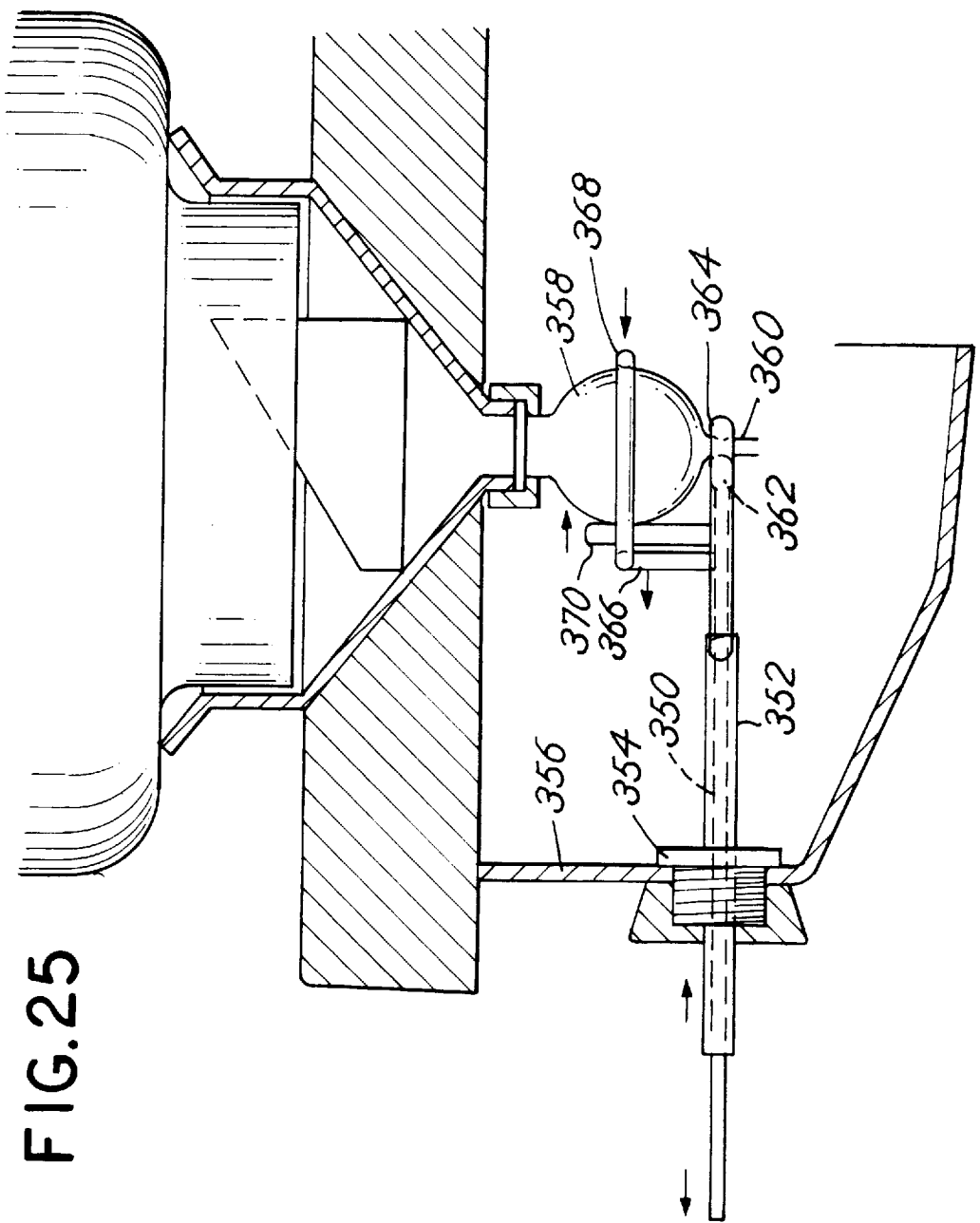

FLUID DISPENSING MECHANISM

BACKGROUND OF THE INVENTION

This invention relates to a mechanism which dispenses measured aliquots of fluid from an elastic discharge tube or nipple of the type having a normally closed orifice.

Dispensing condiments and other fluid materials in the food processing industry is often accomplished by pumping mechanisms which utilize a discharge nozzle and a manually operated pump to effect the movement of fluid through a discharge tube. Spigots which have an "on" and "off" position may also be utilized for such a purpose.

There has developed and remained, however, the need for a mechanism which provides for discharge of an aliquot or measured portion of fluid from an elastic discharge nipple or nozzle.

SUMMARY OF THE INVENTION

In a principal aspect, the present invention comprises a dispenser for discharging aliquot portions of fluid from a flexible tube or nipple. The dispenser is manually operable and compresses the tube uniformly so as to cause the tube to flex a predetermined amount and discharge a desired amount of fluid therefrom.

More specifically, the present invention utilizes a flexible or elastomeric tube having a centerline axis with a fluid passageway therethrough. The tube includes a discharge slot or orifice which is normally closed to preclude fluid flow therethrough but which, because of the elastic characteristic of the tube, will flex when fluid within the tube is sufficiently pressurized. The dispenser mechanism includes a pail. of compression members positioned on opposite sides of the centerline axis of the tube on the outside of the tube. The compression members are each supported by support members and the entire assembly is supported on a frame so that the compression members will remain in position on opposite sides of the centerline axis of the elastic tube. The support members are manually actuable to translate or move the compression members toward one another and simultaneously toward the centerline axis of the flexible tube thus engaging the tube and flexing the tube so as to force fluid within the fluid passageway of the tube through the discharge outlet or orifice from the tube in a measured amount. The support members may be manually released and upon such release, the elastic tube will resume its normal shape and effect return of the compression members to their original beginning state ready to be manually actuated once again and release a further aliquot portion of fluid from the tube.

Various cam actuated and other drive arrangements for moving the support members and thus the compression members are depicted. Additionally, the component parts may be reversed so that the tube may be normally closed by the compression members and then opened by the manual actuation thereof to release fluid flow. Further, one or both of the compression members may be actuated rather than having both of them actuated simultaneously.

Thus it is an object of the invention to provide an improved fluid product dispenser.

It is a further object of the invention to provide a fluid product dispenser which utilizes an elastic tube which has a normal opened condition for fluid retained within the tube and wherein the dispenser mechanism includes compression members aligned on opposite sides of the tube in position for engagement with the tube to flex and compress the tube so as to cause fluid to flow through the tube.

A further object of the invention is to provide an improved fluid product dispenser wherein an elastic tube member, in combination with a tube actuator, will have a first or unactuated condition and a second dispensing condition wherein the tube is compressed to release an aliquot portion of fluid.

Yet another object of the invention is to provide a fluid product dispenser which is easy to manipulate manually, economical, and which provides continuous and uniform aliquot discharge.

These and other objects, advantages and features of the invention will be set forth in the detailed description which follows.

DESCRIPTION OF THE DRAWING

In the detailed description which follows, reference will be made to the drawing comprised of the following figures:

FIG. 3 is a side elevation of an alternative construction for the dispenser clamp mechanism;

FIG. 4 is a side elevation of yet another alternative construction for a clamp mechanism for the fluid product dispenser of the invention;

FIG. 5 is a top plan view of the dispenser of FIG. 4;

FIG. 6 is a side elevation of a further embodiment of a dispenser mechanism;

FIG. 7 is a side elevation of yet another embodiment;

FIG. 8 is a top plan view of the mechanism of FIG. 7;

FIG. 9 is a side elevation of a further embodiment of the invention;

FIG. 10 is a top plan view of the embodiment of FIG. 9;

FIG. 11 is an end view of the embodiment of FIG. 9;

FIG. 25 is a side elevation of another embodiment.

DESCRIPTION OF THE PREFERRED EMBODIMENTS

Figure 1:
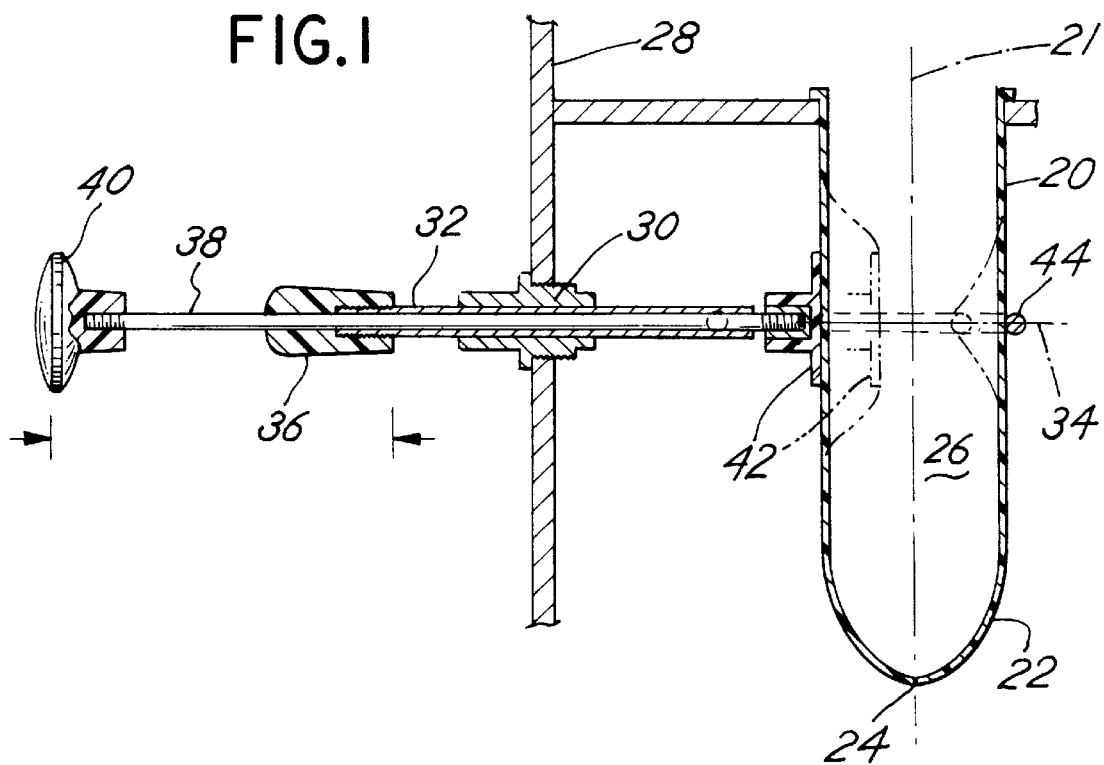
FIG. 1 is an isometric view of a first preferred embodiment of the invention depicting an elastomeric tube and a dispensing clamp assembly in combination with the tube.

The apparatus of the invention is used to dispense fluid materials, such as condiments, in aliquot portions. There are numerous embodiments of the invention. The function of each of the embodiments is, however, quite similar. As a feature of the invention, each of the embodiments is used in conjunction with or in cooperation with an elastic tube such as tube 20. The elastic tube 20 is typically a cylindrical tube made from an elastomeric material such as a rubber or plastic material. The tube 20 is typically cylindrical and includes a nipple or discharge 22 with a discharge orifice 24 that is normally closed. The orifice 24 is normally maintained in a closed position due to the elastic characteristics of the tube 20. The tube 20 thus defines a through passage 26. The tube 20 is connected to a fluid source container (not shown). Thus liquid condiments or fluid flows into the through passage 26 of the tube 20 from a source. The tube 20 is maintained or supported on a frame 28. Thus the frame 28 provides a stationery support for the tube 20 and also serves as a stationery support for the product dispenser mechanism described below.

The dispenser mechanism is mounted on a bushing 30 which is threadably inserted into the frame 28 through an appropriate opening. The bushing 30 is fixed with respect to the frame 28. Telescopically and slidably mounted within the bushing 30 is an outer cylindrical support member 32. The outer cylindrical support member 32 is slidable in the direction of an axis 34 which is a centerline axis of the bushing 30. Affixed onto the tube or support member 32 is a manual knob 36. Slidably mounted within the tube 32 or support member 32 is a rod 38 with a manual knob 40 attached to the outside end thereof. The rod 38 extends through the central passage of the tube 32 and connects with a plunger 42. The plunger 42 is normally positioned against the outside surface of the tube 20. The tube 20, which includes a centerline axis 21, is arranged so that the rod 38, and more particularly the plunger 42, engages the tube 20 in a direction substantially perpendicular to the axis 21.

Figure 2:
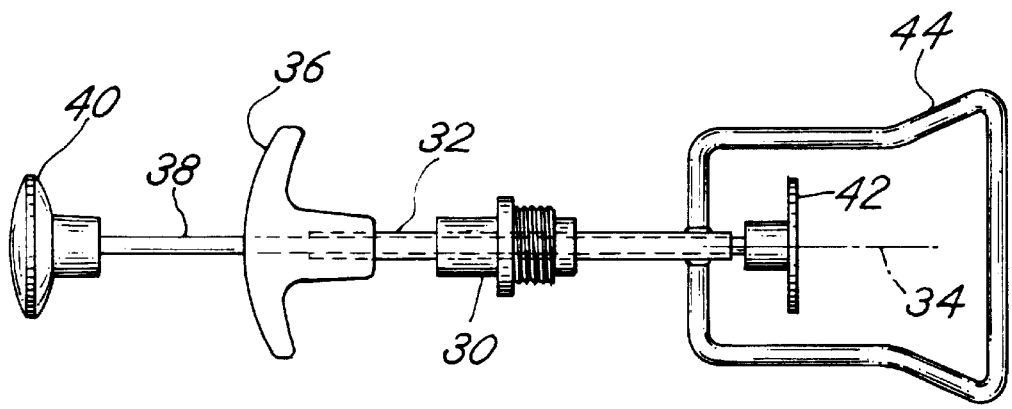
FIG. 2 is a top plan view of the dispenser clamp mechanism utilized in the embodiment of FIG. 1.

The inner end of the slidable tube or support member 32 is connected to a wire or rod frame 44 which, as shown in FIG. 2, fits around the tube 20 and engages against the outside surface of the tube 20 opposite from the plunger 42. In the first embodiment of FIGS. 1 and 2, the rod 38, tube 32 and bushing 30 are all concentric. The plunger 42 and frame 44 lie on the axis 34. The axis 34 is perpendicular to the axis 21.

In operation, the knobs 36 and 40 are manually gripped and simultaneously moved or actuated toward one another. This causes the plunger 42 to move toward the axis 21 and the frame 44 to also move toward the axis 21 simultaneously generally an equal distance and in opposite directions. This compresses the elastomeric tube 20. Fluid retained within that tube 20 is thus pressurized thereby causing the pressurized fluid within the passageway 26 to open the orifice 24 causing an aliquot portion of fluid to be discharged or dispensed through the nipple 22.

It is to be noted that the elastomeric forces associated with the tube 20 as well as the size and position of the orifice 24 enable one to control precisely the amount or aliquot of fluid material discharged from the tube. It is also to be noted that upon manual release of the knobs 36 and 40, the elastomeric tube 20 tends to resume its original shape as depicted in FIG. 1 thereby causing or forcing the plunger 42 and frame 44 to resume their original positions again as illustrated in FIG. 1. Thus the sequence of operation of the dispensing device is reversible due to the elastomeric character of the tube 20.

In operation, it is desirable to have the plunger 42 and frame 44 move simultaneously and in equal and opposite directions toward the axis 21 during the compression of the tube 20. However, one of the members, for example, the support member 32 may be stationery and the plunger 42 then movable toward the axis 21. Additionally, it is possible to reverse the operation of the device. That is, the cylindrical support member 32 can be connected to the plunger 42 and the rod 38 connected to the frame 44. The dispensing device would then be positioned so that the plunger 42 and frame 44 would normally maintain the tube 20 in a closed position preventing fluid flow through the passageway 26. In such circumstances, manual actuation of the knobs 36 and 40 would cause the plunger 42 and frame 44 to spread one from the other, thereby opening the passageway 26 through the tube 20 as the elastic tube 20 assumes its generally cylindrical shape. In other words, the dispensing mechanism in combination with the elastic tube 20 may act as a valving mechanism. Again, one or both of the members 42 and 44, which impinge against the outside surface of the elastic tube 20, may be movable in such a configuration as further illustrated in FIGS. 22 and 23.

FIG. 3 illustrates a further embodiment of the invention. In FIG. 3 a lever 46 is substituted for the manual knobs 36 and 40. The lever 46 has a special construction which enables pivotal movement of the lever 46 to effect movement or actuation of rod 38 simultaneous with tube 32. Thus the lever 46 includes an internal cam surface 50 which is designed to engage with end 52 of rod 38. The lever 46 further includes a detent 54 which receives a transverse pin 56 associated with the tube 32. An external cam 58 is defined on the lever 46. The pin 56 thus defines a pivot axis for the lever 46. Manual actuation of the lever 46 by movement in the counterclockwise direction in FIG. 3 will cause it to rotate about the pin 56. This causes the external cam 58 to engage the outside of the tube 32. The cam 58 thus rides against a plate 60 of the bushing 30. Such pivotal movement causes the tube 32 to move in the left hand direction in FIG. 3. Simultaneously the cam surface 50 engages the end 52 of the rod 38 causing the rod to move in the right hand direction thereby actuating the plunger at the opposite end of the rod 38. Thus movement of a single lever 46 provides for the action which is equivalent to that of manually operating knobs 36 and 40 in the embodiment of FIG. 1.

FIGS. 4 and 5 illustrate yet a further embodiment wherein a single lever 60 may be utilized to actuate both a rod 38 and a tube 32. Again, the like components have like description. The tube 32 includes a pin 56. The lever 60 includes an internal cam surface 62 which engages both the pin 56 as well as end 52 of the rod 38. The cam surface 62 thus moves the pin 56 as well as the end 52 between the position shown in solid lines in FIGS. 4 to the dotted line position in FIG. 4. Note the lever 60 pivots about a fixed pivot axis 64 defined by the pivotal attachment of the lever 60 to the frame 28 or bushing 30.

FIGS. 6 and 7 depict another variation wherein a lever 66 includes a cam surface 68 adapted to engage a pin 56 and end 52 to operate the dispensing device previously described. The lever 66 includes a flexible living hinge 70 and an attachment flange 72 which is attached to the frame 28 by means of the bushing 30.

FIGS. 7 and 8 illustrate yet another embodiment. In FIGS. 7 and 8 a push button 73 includes an internal cam surface 74 cooperative with pin 56 and end 52. The push button 73 is retained in a housing 75. The housing 75 is attached to frame 28 by means of the bushing 30 which attaches integrally molded flange 76 to the frame 28. Again the cam surface 74 cooperates with the pin 56 and end 52 so as to operate the tube 32 and rod 38.

FIGS. 9, 10 and 11 illustrate yet another embodiment of the invention wherein the tube 32 and rod 38 are operable in response to rotational movement or twisting of a cam actuator 80. Thus cam actuator 80 includes an internal cam surface 82 which again cooperates with pin 56 and end 52. The cam actuator 80 is mounted on a shaft 84 which is attached to the bushing 30. The shaft 84 includes a flange 86 which retains the actuator 80 by engaging against an annular surface 88 defined within the interior of the actuator 80. FIG. 10 is a top view of the cam surface. Rotation of the actuator 80 as depicted in FIG. 11 will cause the pin 56 and end 52 to engage against the cam surface 82 and thereby move, in the previously described manner, to effect operation of the aliquot dispenser.

Figure 12:
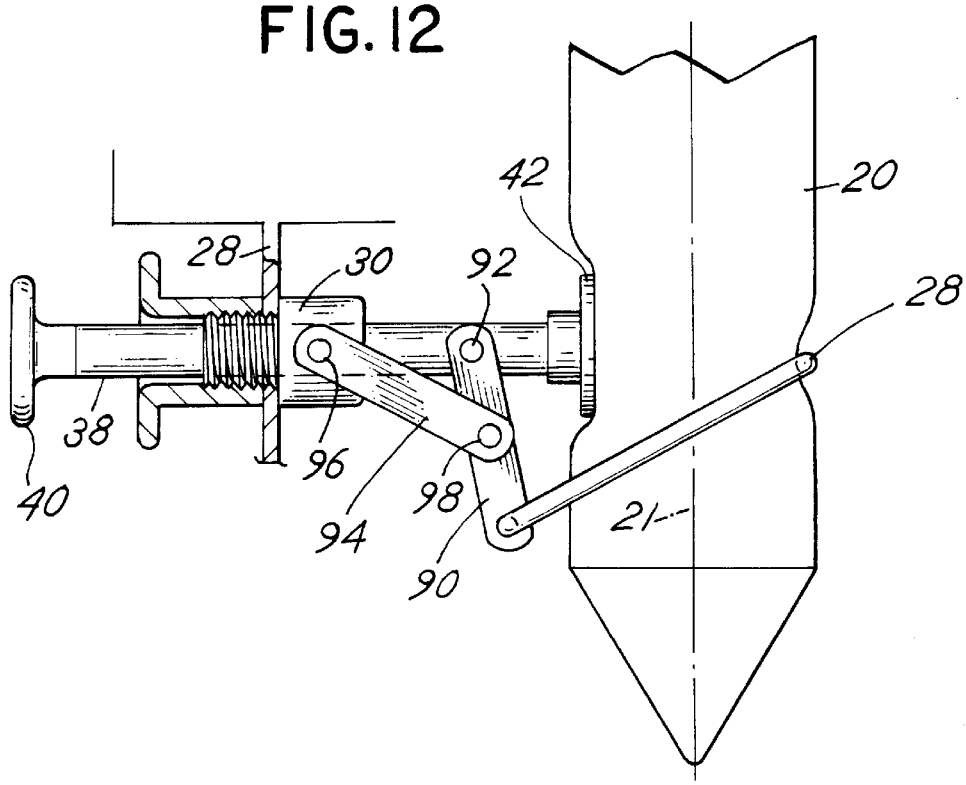
FIG. 12 is a side elevation of yet a further embodiment illustrating the mechanism during partial discharge of an aliquot portion.
Figure 13:
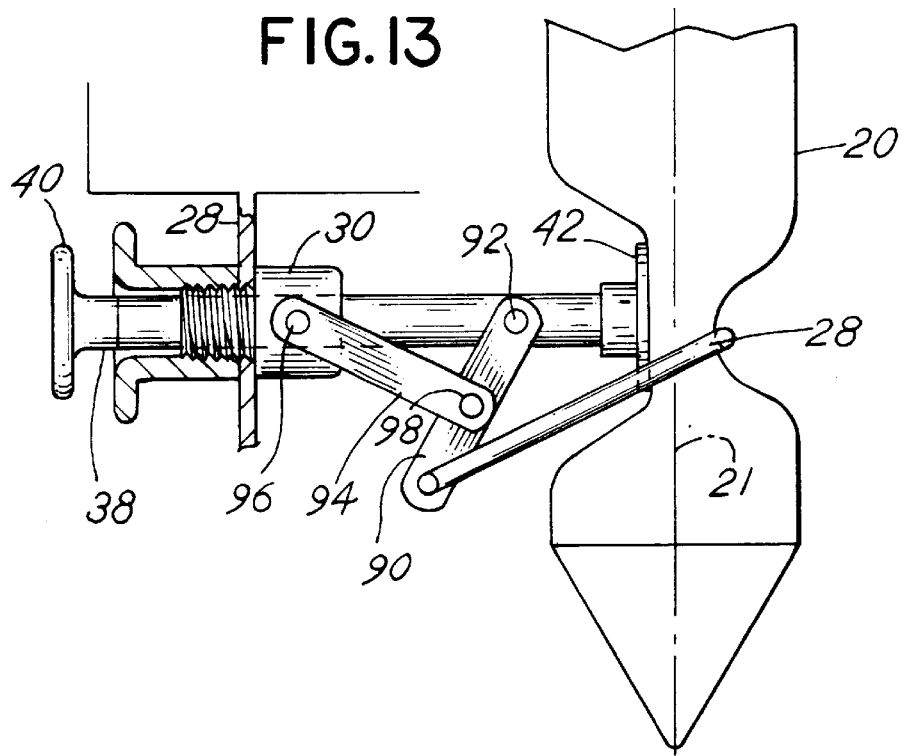
FIG. 13 is a side elevation of the embodiment of FIG. 12.

FIGS. 12 and 13 illustrate a further embodiment of the invention. Again, like numbers are assigned to like parts of the construction. The tube 20 is mounted on the frame previously described. A rod 38 includes a knob 40. The rod 38 is mounted in bushing 30 supported by a frame 28. The wire frame 28 is mounted on a linkage arm 90. Arm 90 is pivotally attached to the rod 38 by a pivot pin 92. The opposite end of the linkage arm 90 is attached pivotally to the frame 28. A second linkage arm 94 connects between the bushing 30 and the center point of the linkage arm 90. The linkage arm 94 is pivotal about its pivot point 96 and 98 which constitute the connection points to the bushing 30 and arm 90 respectively. By manually pushing on the knob 40, the plunger 42 will engage the tube 20. Simultaneously the rod 38 will cause the arm 90 to pivot about the pivot point 98 causing the frame 28 to be simultaneously moved towards the center line 21. FIG. 13 illustrates the relative position of the component parts when the knob 40 is pushed to its full extent.

Figure 14:
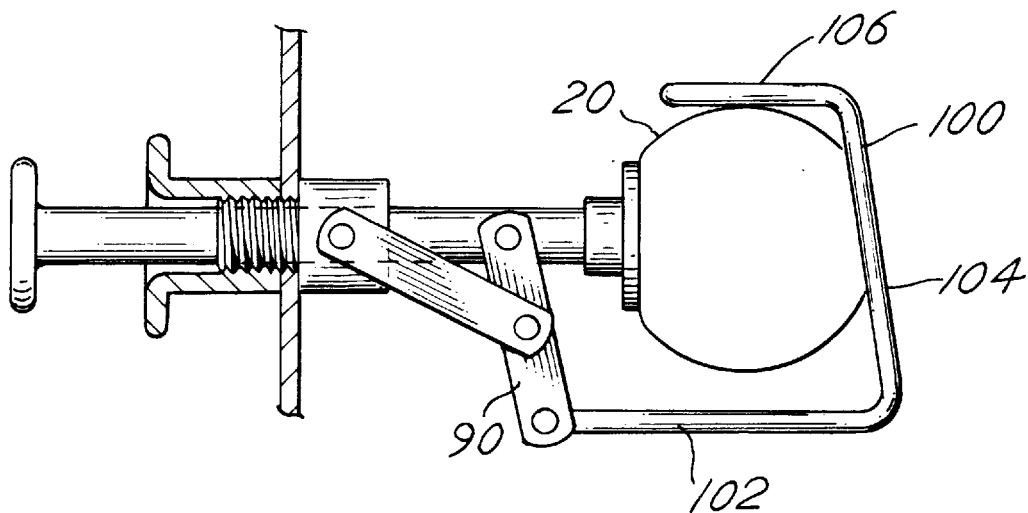
FIG. 14 is a top plan view or section view of yet another embodiment of the invention.
Figure 15:
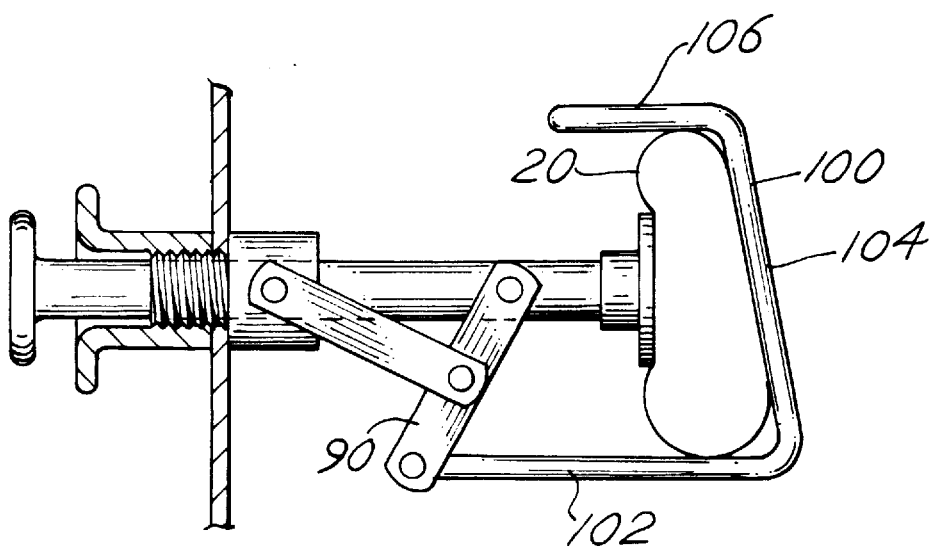
FIG. 15 is a top cross section of the embodiment of FIG. 14 wherein the dispenser is actuated for fluid discharge.
Figure 16:
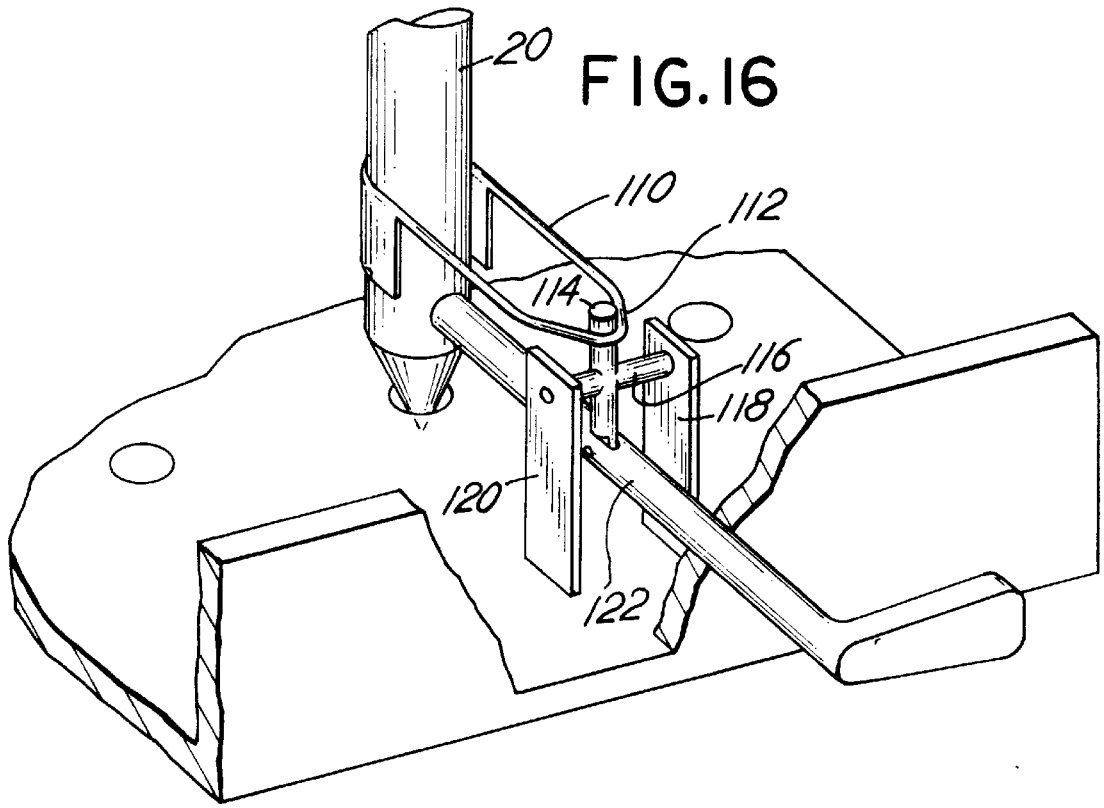
FIG. 16 is an isometric view of an alternative construction.

FIGS. 14 and 15 illustrate an embodiment quite similar to that of FIGS. 12 and 13. However, the frame 28 is replaced by a hook mechanism. Thus a hook 100, which includes a first run 102, a central run 104 and an end run 106 are connected to a linkage arm 90. The remainder of the construction is quite similar to that of FIGS. 12 and 13 except that the linkage mechanism has been rotated 90° so that the hook member 100 may be fitted around the tube 20.

FIGS. 16 through 19 illustrate additional embodiments of the invention which all rely upon the elastomeric characteristics of tube 20 and which include various types of mechanisms equivalent to the plunger and the frame. Thus in FIG. 16 a frame 110 include a loop 112 which engages a toggle arm 114 extending upwardly from a pivot rod 116 mounted in opposed plates 118 and 120. A push rod 122 engages the toggle arm 114. Upon pushing the push rod 122 toward the centerline axis of the tube 20 the toggle arm 114 causes the frame 110 to move in the opposite direction in an equal amount.

Figure 17:
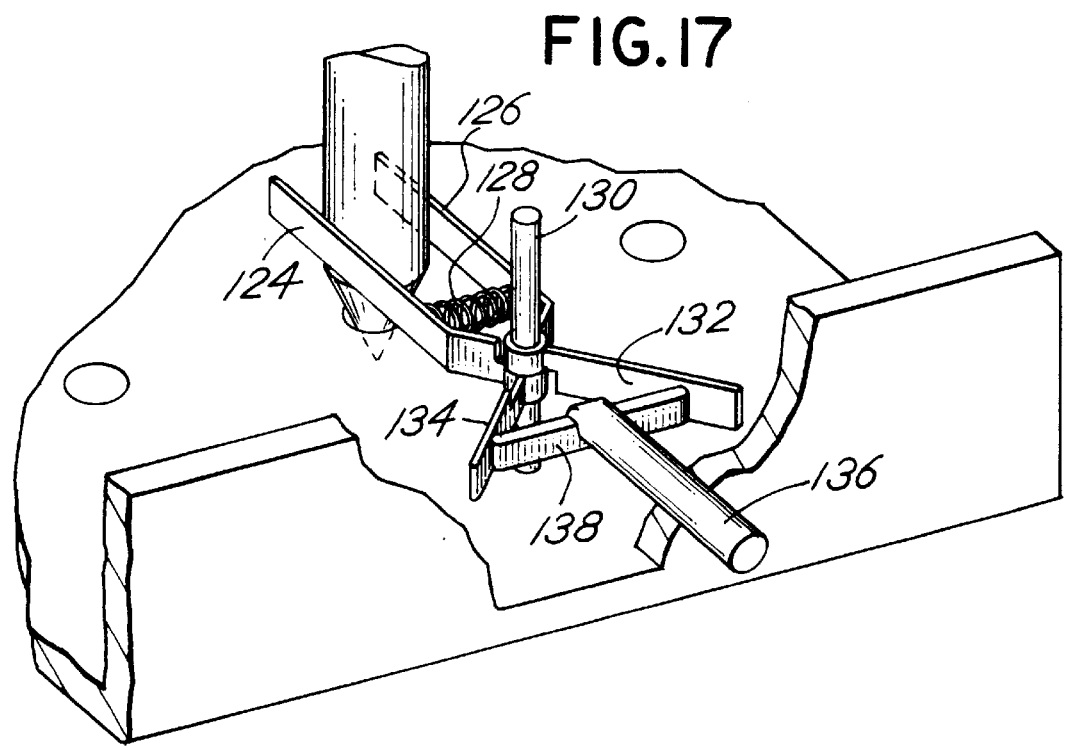
FIG. 17 is an isometric view of yet another alternative construction.

In FIG. 17 a pair of opposed plates 124 and 126 engage on opposite sides of the tube 20. The plates 124 and 126 are normally maintained snugly against the opposite sides of the tube 20 by means of a spring 128. The plates 124 and 126 are pivotally mounted on the vertical rod 130. Actuating arms 132 and 134 are associated with plates 126 and 124 respectively. A push rod actuator 136 actuates a lever arm 138 to cause the plates 132 and 134 to be spread apart thereby compressing the plates 124 and 126.

Figure 18:
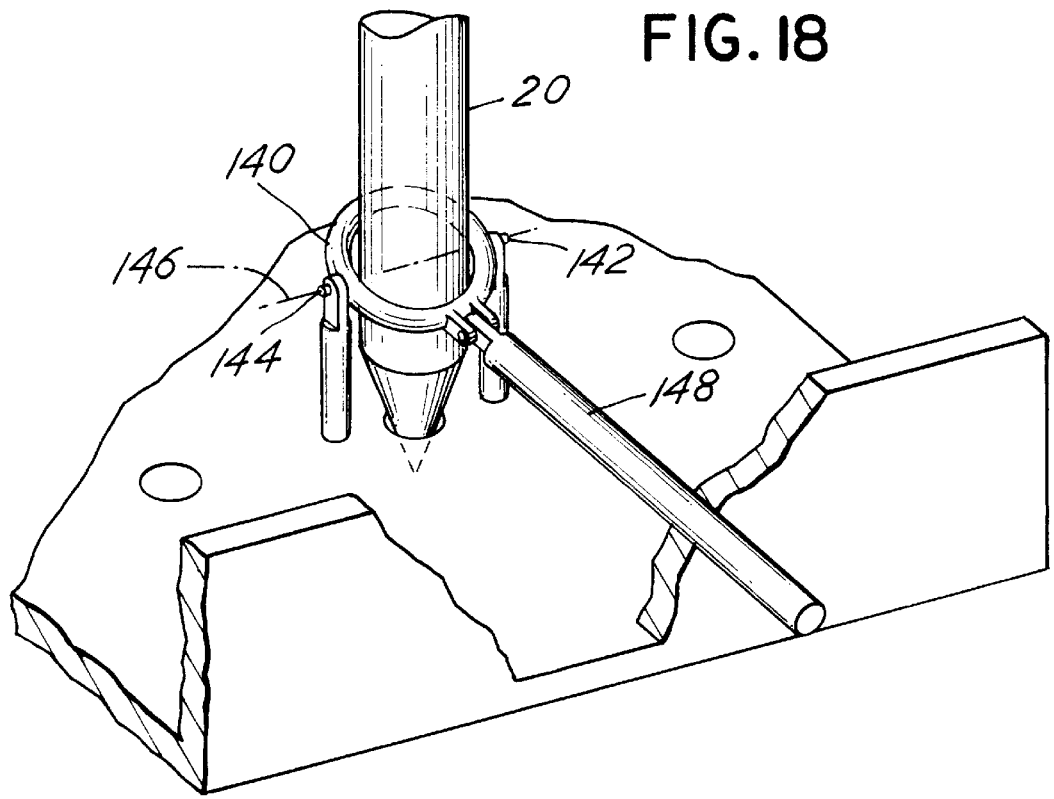
FIG. 18 depicts a further alternative construction in an isometric view.

FIG. 18 discloses the elastic tube 20 encircled by a ring 140 mounted on pins 142 and 144 defining a pivot axis 146. A push rod or plunger 148 is actuated by engaging the ring 140 so that it will pivot about the axis 146 causing the opposite sides of the ring 140 to engage against and compress the tube 20.

Figure 19:
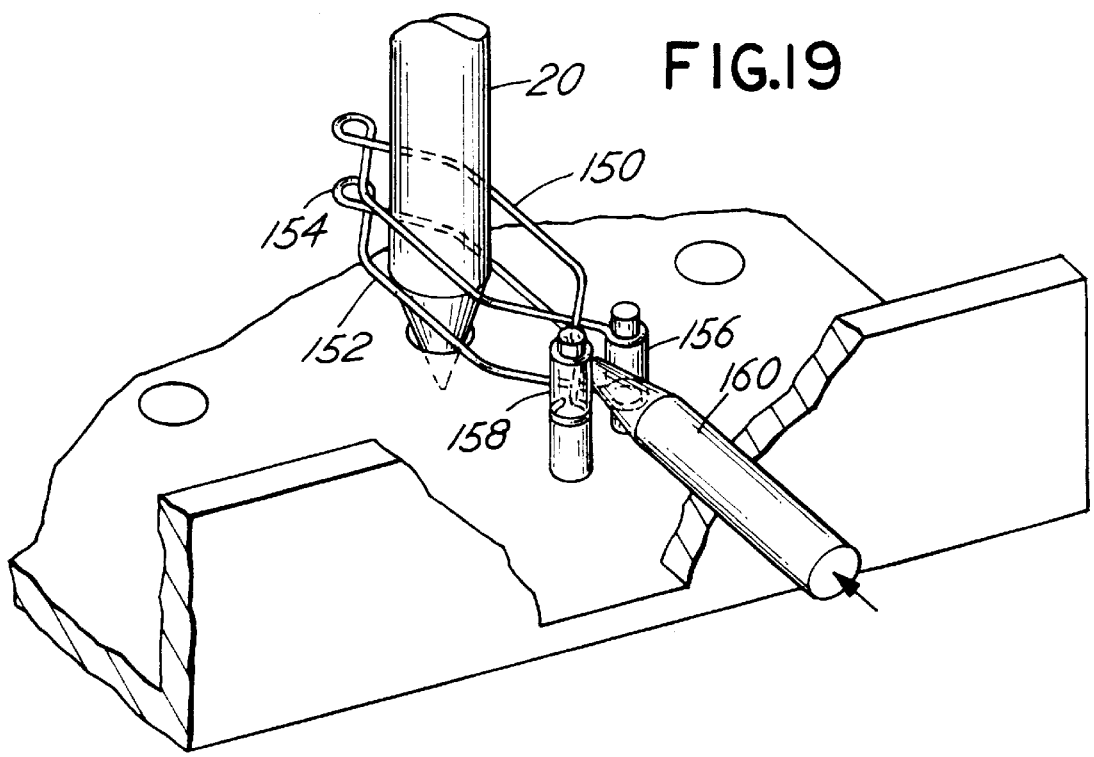
FIG. 19 is yet another isometric view of a further alternative construction.

FIG. 19 illustrates an embodiment wherein tube 20 is surrounded on opposite sides by a wire carriage 150 and 152. The wire carriage 150, 152 is connected by integral spring clamps 154. The opposite side or ends of the frames 150 and 152 define roller bearings 156 and 158 into which a push rod or cam lever 160 may be inserted or twisted to thereby cause the frames 150 and 152 to squeeze the tube 20 and thereby cause an aliquot portion of material to be discharged from the tube 20.

Figure 20:
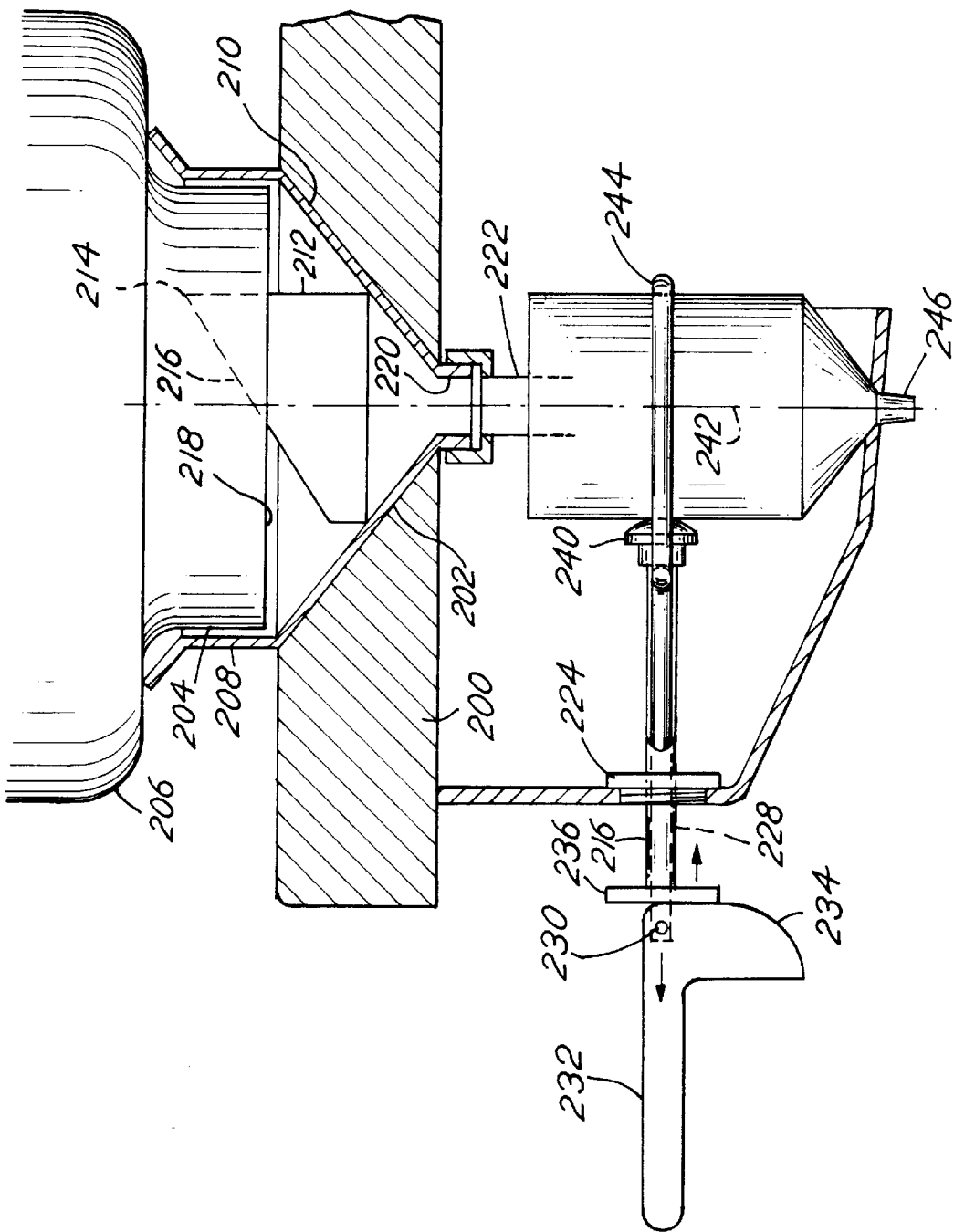
FIG. 20 is a side, partial cross sectional elevation of a further embodiment of the invention.

Referring next to FIG. 20, there is illustrated a further embodiment of the invention, including some additional features associated with fluid containers in combination with the fluid dispensing mechanism of the present invention. Thus, a fluid dispensing mechanism includes a support frame 200 which includes a transition funnel or support funnel 202 into which an open neck 204 of a bottle or fluid container 206 may be fitted. Thus the transition funnel 202 includes a collar 208 to receive the neck 204 of the bottle 206. A funnel 210 connects from the collar 208. Within the frustoconical section or funnel 210 is a piercing frustoconical section or blade 212 which has a piercing point 214 and a cutting edge 216 positioned to cut through a seal 218 for the bottle 206. Thus upon inversion of the bottle 206 and placement thereof in the collar 208, the cutting blade 212 will pierce the seal 218 thereby permitting fluids from the bottle 206 to flow through the funnel 210 and then through a discharge outlet 220 into an elastomeric tube 222.

The elastomeric tube 222 is operated by means of a cam actuated plunger mechanism. Thus a bushing 224 supports a concentric tube 226 having a slidably telescoping rod 228 mounted therein. The rod 228 is pivotally attached via a pivot pin 230 to a cam actuated lever 232. The cam actuated lever 232 further includes a cam surface 234 which acts against a plate 236 affixed to the tube 226. The opposite end of the tube 226 is attached to a plunger 240 which impinges against one side of the elastomeric tube 222 having centerline axis 242. The opposite side of the tubular member or tube 222 is engaged by an encircling frame member 244 which is attached to the rod 228. Thus counterclockwise movement of the actuator 232 about the axis of pin 230 will cause the rod 228 to move to the left in FIG. 20, and the tube 226 to move to the right thereby causing the plunger 240 and frame 244 to move toward one another and toward the axis 242. An aliquot portion of the fluid is then dispensed through the nipple 246 associated with the tube 222.

Figure 21:
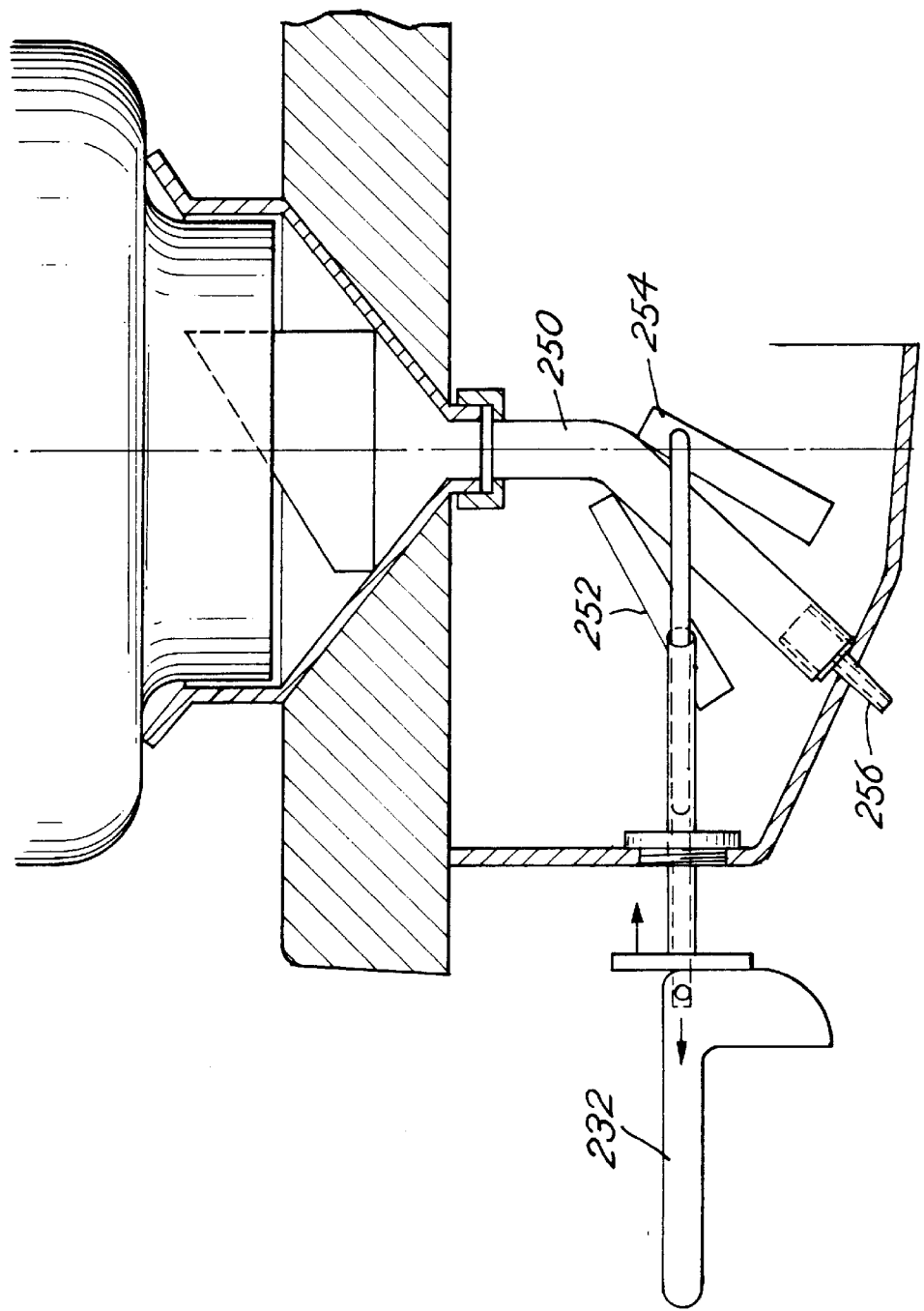
FIG. 21 is a side, partial cross sectional elevation of another embodiment of the invention.

FIG. 21 depicts a further embodiment of the dispenser which is quite similar to the embodiment of FIG. 20. The difference is associated with the construction of a tube 250 and the plunger 252 as well as the frame elements 254 which engage with and actuate the tube 250. All the other remaining parts of the embodiment of FIG. 21 are the same as those previously discussed with respect to the embodiment of FIG. 20. Thus the plunger comprises a plate element 252 as does the plate element 254 associated with the frame member 244. These plate elements 252, 254 are compressed together upon actuation of the lever 232. They thereby effect a sealing action with respect to any back flow of material to a nozzle 256, inasmuch as the elements 252 and 254 tend to squeeze or force fluid from the tube 250 outward through a no-drip nozzle 256 as the sides of the elements 252 and 254 progressively engage and squeeze the sides of the tube 250 in a gradual movement toward the nozzle 256.

Figure 22:
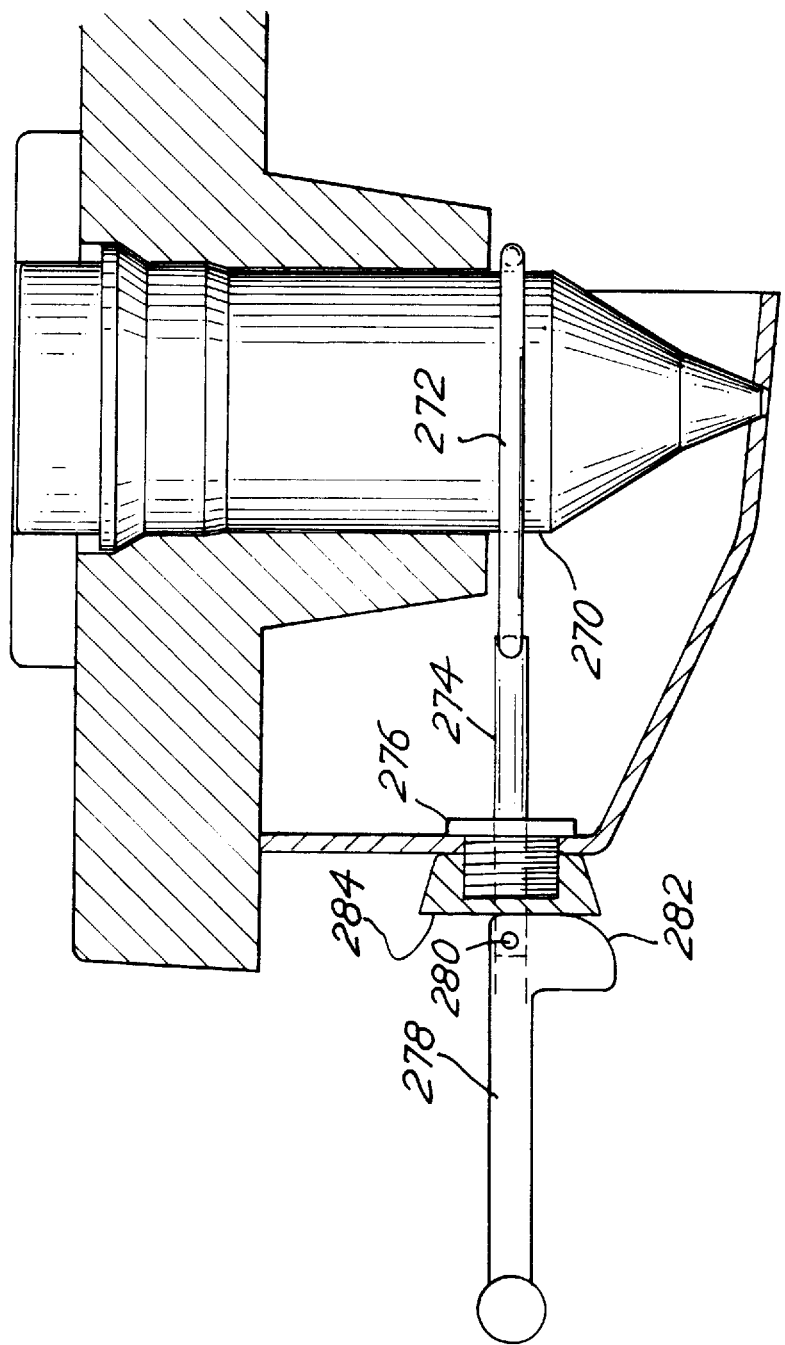
FIG. 22 is a side elevation of another embodiment.

FIG. 22 relates to a construction where a frame member 272 only is actuated to engage a nipple or nozzle. Thus a flexible tube 270 is engaged by frame member 272. The frame member 272 is mounted on a rod 274 journaled through a bushing 276 attached to a lever 278 through a pivot pin 280. The counterclockwise action of the lever 278 causes a cam surface 282 to engage against an outside surface 284 of the bushing 276 thereby translating the frame member 272 against the tube 270 causing the tube 270 to be compressed and thereby discharging an aliquot portion of fluid.

Figure 23:
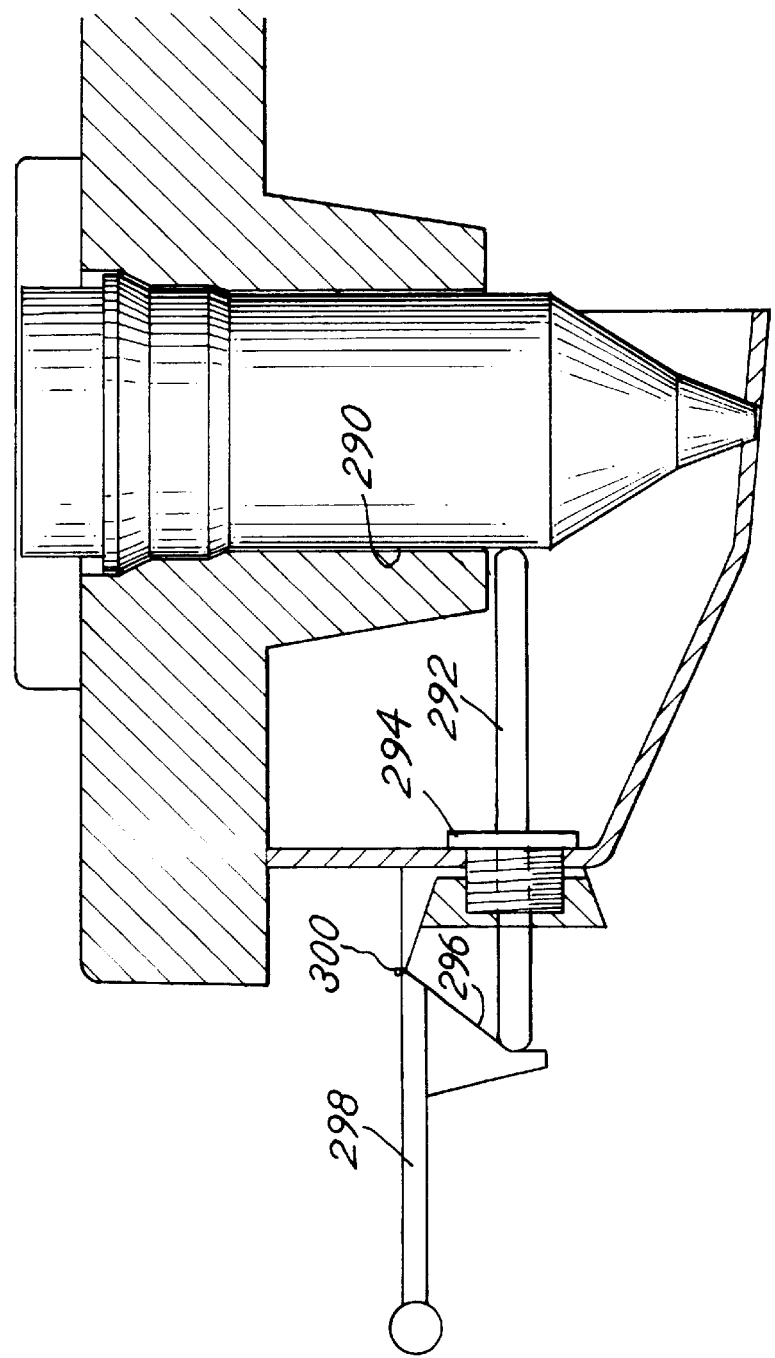
FIG. 23 is a side elevation of another embodiment.

FIG. 23 illustrates an embodiment wherein only the cam or plunger is effective to cause fluid discharge from a tube. There a tube 290 is impinged by a plunger 292 slidably mounted in a bushing 294. The plunger 292 is engaged by a cam surface 296 of a lever 298 when the lever 298 is moved in a counterclockwise direction. The lever 298 is in this circumstance is attached or hinged by a living hinge 300 about which the lever 298 is pivotal. In this manner, the cam surface 296 effects operation of the plunger 292 to compress the tube 290 and discharge an aliquot portion of fluid.

Figure 24:
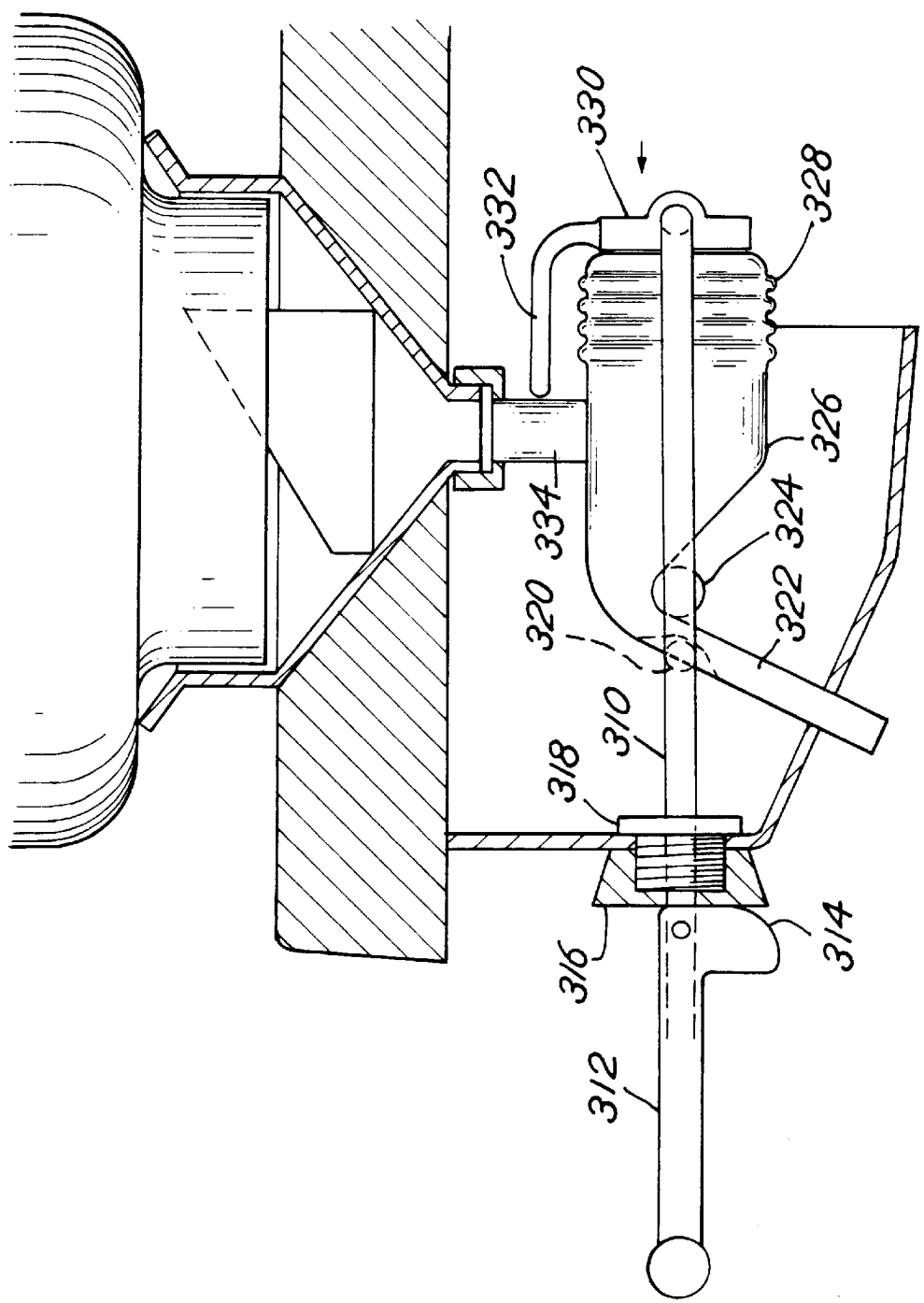
FIG. 24 is a side elevation of yet another embodiment.

Referring next to FIG. 24, there is depicted a dispenser mechanism having a single rod 310 actuated by a lever 312 having a cam surface 314 coactive with a cam surface 316 of a bushing 318. The rod 310 includes a transverse pin 320 on one side of a discharge nozzle 322. The opposite side of the discharge nozzle 322 is positioned against a fixed rod 324. The discharge nozzle 322 is connected to a discharge reservoir 326 which includes a bellows 328 at one end thereof. The rod 310 further includes a bracket 330 at its opposite end. The bracket 330 is moveable with the rod 310 to engage against the bellows 328 and drive fluid retained therewithin the reservoir 326 through the discharge nozzle 322. Movement of the bracket 330 to the left in the figure also releases the pin 320 from the nozzle 322 thereby opening a fluid passage through the nozzle 322 when the lever 312 is actuated. Additionally, as the bracket 330 is moved, a brace 332 attached to the bracket 330 moves to the left in FIG. 24 and engages against a discharge tube 334 from a container. This closes off and precludes back flow from the reservoir 326 into the tube 334.

Finally there is depicted in FIG. 25 an embodiment which includes a rod member or rod 350 concentrically and telescopically mounted in a tube 352 both of which are telescopically mounted in a bushing 354 attached to a frame 356. The embodiment of FIG. 25 provides a mechanism wherein a tube or a reservoir 358 is squeezed or deformed by actuation of the rod 350 and concentric tube 352 as the nozzle or discharge tube 360 from the reservoir 358 is released or opened. That is, the center rod 350 includes a plunger end 362 which is normally engaged against the discharge nipple or tube 360. The tube 352 includes a pin or bar 354, which is also simultaneously engaged against the nipple or tube 360 when the assembly is in the inactivated or closed position. The rod 350 further includes a bracket 366 which fits around the reservoir 358 and includes a brace 368 impinging against one side of reservoir 358 as the opposite of reservoir 358 is engaged with or impinged by a plate or bracket 370 extending from the tube 352. A lever arm construction, such as depicted is in prior figures for movement of both a rod and concentric tube, is used to actuate the rod 350 and tube 352. Upon such actuation, the brace 368 and the plate or bracket 370 are moved toward one another to squeeze liquid material from the reservoir 358. Simultaneously the plunger 362 and brace 364 separate from one another so that the liquid can flow easily through a nipple or discharge tube 360. Reversing the direction of the rod 350 and tube 352 will simultaneously reverse the actions of the described plunger 352 and frame member 364.

There are various other alternatives to the embodiment described. Various mechanisms for actuating a plunger on the rod frame and manual actuation members may be utilized. The word "tube" is to be interpreted is in a generic sense to include any elastomeric container type member which is compressible to release fluid and which may resume its original or nearly original shape upon release of compression members impinging on the tube. Thus the invention is to be limited only by the following claims and equivalents thereof.

What is claimed is:

1. A fluid product dispenser comprising, in combination:
   an elastic tube with a centerline axis and a through passage for fluid, said tube having a non-compressed configuration wherein the through passage is open and a compressed configuration wherein the through passage is at least partially closed, said tube defining a conduit for a fluid product, said tube having an outside surface;
   a first movable compression member positioned on one side of the centerline axis on the outside of the tube;
   a second movable compression member on the opposite side of the centerline axis generally opposed to the first compression member on the outside of the tube;
   said first compression member mounted on a first movable support member;
   said second compression member mounted on a movable second support member; and
   a support frame, said first and second support members mounted on the frame, said frame maintaining the compression members in opposed relation on opposite sides of the tube generally perpendicular to the centerline axis;
   said first and second support members movable in opposite directions simultaneously toward the centerline axis to compress the tube and reduce the cross section area between the compression members to cause fluid discharge from the tube.

2. The dispenser of claim 1 wherein the tube includes a normally closed dispenser nozzle with a normally closed discharge opening, said opening responsive to fluid pressure in the tube to open and dispense fluid.

3. The dispenser of claim 1 wherein both of the movable compression members are positioned on opposite sides of the tube and extend in the same direction from the axis and are generally parallel blades, and the support members connect to the compression members to effect movement; and further including a pivotal cam mounted on the frame to simultaneously engage the support members.

4. The dispenser of claim 1 wherein the first support member comprises a rod attached to the first compression member, said first compression member comprising a plunger, said second support member comprises linkage attached to the rod and the frame, said linkage further connected to a hook member comprising the second compression member.

5. The dispenser of claim 1 wherein the support members comprise rods extending parallel from the same side of the tube with one rod attached to the first compression member and the other rod attached to the second compression member, one of said compression members being linked to the attached rod and extending around the tube to the opposite of the centerline axis of the tube, said rods including manual actuation members.

6. The dispenser of claim 5 wherein the manual actuation members comprise a lever pivotally attached to the frame and including a cam surface for driving each of the rods.

7. The dispenser of claim 1 wherein the support members are linked together.

8. The dispenser of claim 7 wherein the support members are linked by mechanical links.

9. The dispenser of claim 1 wherein the first compression member comprises a plunger, the second compression member comprises a hook member having an arm on the opposite side of the tube from the plunger.

10. The dispenser of claim 9 wherein the first support member is a rod attached to the plunger and the second support member is a tube with the rod telescoped in the tube, said second support member attached to the hook basket.

11. The dispenser of claim 1 wherein the first and second support members comprise a tube with a concentric rod telescoped in the tube.

12. The dispenser of claim 11 wherein the support members further include manual gripping handles for simultaneous manual engagement for movement toward one another when the tube is compressed.

13. The dispenser of claim 11 wherein the support members further include a manually operated cam block pivotally attached to the second support member and including a cam surface slidably engaged with the first support member.

14. The dispenser of claim 11 wherein the support members further include a manually operated cam block pivotally attached to the frame and including separate cam surfaces for engaging the first and second support members simultaneously and for driving the support members in the opposite directions.

* * * * *